United States Patent
Sugioka et al.

(10) Patent No.: US 11,146,957 B2
(45) Date of Patent: Oct. 12, 2021

(54) PAIRING SYSTEM FOR REMOTELY MANAGING HOT-WATER UTILIZATION FACILITY AND COMMUNICATION ADAPTER USED IN SYSTEM

(71) Applicant: NORITZ CORPORATION, Hyogo (JP)

(72) Inventors: Masayuki Sugioka, Hyogo (JP); Yoshihiko Maekawa, Hyogo (JP); Tsuyoshi Yamashita, Hyogo (JP); Masaru Ono, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 218 days.

(21) Appl. No.: 16/476,544

(22) PCT Filed: Mar. 23, 2018

(86) PCT No.: PCT/JP2018/011576
§ 371 (c)(1),
(2) Date: Jul. 8, 2019

(87) PCT Pub. No.: WO2018/186199
PCT Pub. Date: Oct. 11, 2018

(65) Prior Publication Data
US 2021/0185743 A1    Jun. 17, 2021

(30) Foreign Application Priority Data

Apr. 7, 2017 (JP) .............................. JP2017-076767

(51) Int. Cl.
*H04W 12/08*    (2021.01)
*H04W 76/14*    (2018.01)
(Continued)

(52) U.S. Cl.
CPC ............ *H04W 12/08* (2013.01); *F24D 19/10* (2013.01); *G05B 19/042* (2013.01); *H04L 67/24* (2013.01);
(Continued)

(58) Field of Classification Search
CPC ....... H04W 76/14; H04W 84/12; F24D 19/10; G05B 19/042; G05B 2219/25252; H04L 67/306

See application file for complete search history.

(56) References Cited

U.S. PATENT DOCUMENTS

2005/0281198 A1* 12/2005 Miyamoto .......... H04L 12/1439
370/235
2014/0297843 A1* 10/2014 Shiga ...................... H04L 67/22
709/224

FOREIGN PATENT DOCUMENTS

| JP | 2016039575 | 3/2016 |
|---|---|---|
| JP | 2017058026 | 3/2017 |
| WO | 2016046861 | 3/2016 |

OTHER PUBLICATIONS

"International Search Report (Form PCT/ISA/210) of PCT/JP2018/011576," dated Jun. 12, 2018, with English translation thereof, pp. 1-2.

* cited by examiner

*Primary Examiner* — Duc C Ho
(74) *Attorney, Agent, or Firm* — JCIPRNET

(57) ABSTRACT

A communication adapter for collecting various kinds of information from a water-heating system and providing the information to an administration center via a wireless LAN router functions as an access point for providing a direct wireless communication with a smartphone; in response to a request from the smartphone via the direct wireless communication, it provides pairing authentication information to
(Continued)

the smartphone; in response to a request from the smartphone, it initializes the wireless LAN connection information for the wireless LAN router to disconnect the wireless link to the wireless LAN router; and, when the wireless LAN connection information is set by its WPS function, it establishes a wireless link to the wireless LAN router and transmits the pairing authentication information to the administration center via the wireless LAN router.

2 Claims, 3 Drawing Sheets

(51) Int. Cl.
*F24D 19/10* (2006.01)
*G05B 19/042* (2006.01)
*H04L 29/08* (2006.01)
*H04W 84/12* (2009.01)

(52) U.S. Cl.
CPC ........... *H04L 67/306* (2013.01); *H04W 76/14* (2018.02); *G05B 2219/25252* (2013.01); *H04W 84/12* (2013.01)

PAIRING SYSTEM FOR REMOTELY MANAGING HOT-WATER UTILIZATION FACILITY AND COMMUNICATION ADAPTER USED IN SYSTEM

CROSS-REFERENCE TO RELATED APPLICATION

This application is a 371 application of the International PCT application serial no. PCT/JP2018/011576, filed on Mar. 23, 2018, which claims priority benefits of Japan Patent Application No. 2017-076767 filed on Apr. 7, 2017. The entirety of each of the abovementioned patent applications is hereby incorporated by reference herein and made a part of this specification.

TECHNICAL FIELD

The present invention relates to a pairing system for remotely managing a hot-water utilization facility (e.g., a water heater, a multiple-water-heater system, a device for reheating or filtering water in a bathtub, or a hot-water heating device), and a communication adapter used in such a system.

BACKGROUND ART

The applicant of the present application has developed remote monitoring systems for remotely monitoring water-heating systems, and one such system is disclosed in JP 2017-58026 A (Patent Document 1).

This remote monitoring system includes a communication adapter (4) attached to a water-heating system. This communication adapter is communicably connected to the water-heating system via two-core communication lines, for example, to obtain various kinds of information from the water-heating system. Further, the communication adapter is connected to a router (5) connected to a communication network, such as the internet, so as to be communicably connected to an administration center (1) via the router and communication network, and is configured to transmit various kinds of information obtained from the water-heating system to the administration center.

PRIOR ART DOCUMENTS

Patent Documents

Patent Document 1: JP 2017-58026 A

SUMMARY OF THE INVENTION

Problems to be Solved by the Invention

While Patent Document 1 discloses a remote monitoring system for business-use multiple-water-heater systems, there is a demand for applying this system to remote monitoring of hot-water utilization facilities, such as water heaters, installed in individual homes, where information on how these home water heaters are being utilized is gathered to provide big data, which is then analyzed to provide research materials that can be used to further improve heat efficiency at the water heaters, for example.

In recent years, wireless LAN routers have become popular in ordinary homes, and there is a demand for an arrangement that enables internet connection via such wireless LAN routers; as such, a communication adapter for an ordinary home is required to be configured to function as a wireless LAN child device and configured to establish a wireless link to the wireless LAN router to be communicably connected to the administration center via the wireless LAN router. While a wireless LAN router is typically installed indoors, a communication adapter wirelessly connected to the wireless LAN router may be installed outdoors, e.g., in a garage in which the water heater is also installed.

Meanwhile, to further increase convenience for their users, the applicant of the present application has conducted research to let a user to use a mobile wireless communication terminal, such as a smartphone, to remotely monitor and/or remotely operate a water heater connected to a communication adapter, and realized the necessity of security measures that prevent a third party from illicitly obtaining information on the water heater or illicitly operating the water heater.

One of the security measures being considered is to give each user account information (for example, account ID and password) and allow the user to use this information on his/her mobile wireless terminal to log into the administration center in order to use the mobile wireless terminal to remotely monitor or remotely operate a water heater connected to a communication adapter associated (i.e. paired) with the account information of the user.

In this security measure, it is important to prevent illicit pairing between the user account and communication adapter.

In view of this, an object of the present invention is to provide a communication adapter that prevents transmission of authentication information for pairing from a communication adapter installed outdoors to the administration center even when the communication adapter is illicitly operated. Another object of the present invention is to provide a pairing system for remotely managing a hot-water utilization facility using such a communication adapter.

Means for Solving the Problems

To achieve the above objects, the present invention uses the following technical means.

The communication adapter according to the present invention is a communication adapter communicably connected to a hot-water utilization facility via a communication line and adapted to establish a wireless link to a wireless LAN router connected to a communication network, so as to be communicably connected to an administration center for remotely monitoring and/or remotely operating the hot-water utilization facility via the wireless LAN router, the communication adapter adapted to function as an access point for providing a direct wireless communication with a mobile wireless communication terminal, wherein the communication adapter is configured, with the mobile wireless communication terminal having established a wireless link in the direct wireless communication, in response to a request from the mobile wireless communication terminal via the direct wireless communication, to provide predetermined pairing authentication information to the mobile wireless communication terminal via the direct wireless communication;

in response to a request from the mobile wireless communication terminal or autonomously when providing the pairing authentication information, to initialize entire or a portion of wireless LAN connection information for a wireless link to the wireless LAN router to disconnect the wireless link to the wireless LAN router; and, when the wireless LAN connection information is set after the initialization, to establish a wireless link to the wireless LAN router and transmit the pairing authentication information to the administration center via the wireless LAN router.

The communication adapter of the present invention as described above provides pairing authentication information to a mobile wireless communication terminal via a direct wireless communication and disconnects the wireless link to the wireless LAN router, and is configured to transmit the pairing authentication information to the administration center via the wireless LAN router when the wireless link to the wireless LAN router has been established as the adapter automatically sets wireless LAN connection information using the WPS function of the indoor wireless LAN router or the owner of the wireless LAN router manually sets wireless LAN connection information that is only known to this owner; if the operation of establishing a wireless link to the wireless LAN router is not performed, the pairing authentication information is not transmitted to the administration center, thereby preventing a third party from operating the communication adapter to cause the pairing authentication information to be transmitted from the communication adapter to the administration center.

Further, since the communication adapter is configured that the pairing authentication information is provided to the mobile wireless communication terminal from the communication adapter via a direct wireless communication, the user need not perform the operation of entering the pairing authentication information on his/her mobile wireless communication terminal, thereby simplifying user operation on the mobile wireless communication terminal during pairing.

Further, a pairing system for remotely managing a hot-water utilization facility according to the present invention includes: a communication adapter communicably connected to the hot-water utilization facility via a communication line; a wireless LAN router; an administration center for remotely monitoring and/or remotely operating the hot-water utilization facility; and a mobile wireless communication terminal.

The wireless LAN router and administration center are connected to a communication network.

The administration center is adapted to manage a plurality of user accounts that allow login from the mobile wireless communication terminal.

The communication adapter is adapted to establish a wireless link to the wireless LAN router to be communicably connected to the administration center via the wireless LAN router, the communication adapter adapted to function as an access point for providing a direct wireless communication with the mobile wireless communication terminal, wherein the communication adapter is configured, with the mobile wireless communication terminal having established a wireless link in the direct wireless communication, in response to a request from the mobile wireless communication terminal via the direct wireless communication, to provide predetermined pairing authentication information to the mobile wireless communication terminal via the direct wireless communication;

in response to a request from the mobile wireless communication terminal or autonomously when providing the pairing authentication information, to initialize entire or a portion of wireless LAN connection information for a wireless link to the wireless LAN router to disconnect the wireless link to the wireless LAN router; and, when the wireless LAN connection information is set after the initialization, to establish a wireless link to the wireless LAN router and transmit the pairing authentication information to the administration center via the wireless LAN router.

The mobile wireless communication terminal is configured, after obtaining the pairing authentication information from the communication adapter, to log into the administration center and transmit the pairing authentication information to the center.

When the administration center has verified that the pairing authentication information received from the communication adapter matches that received from the mobile wireless communication terminal, the center associates identification information of the communication adapter that has transmitted the pairing authentication information with a user account to which login has occurred through the mobile wireless communication terminal and thus manages the identification information.

In the above-described pairing system for remotely managing a hot-water utilization facility according to the present invention, the communication adapter disconnects the wireless link to the wireless LAN router, and is configured to transmit pairing authentication information to the administration center via a wireless LAN router when a wireless link to the wireless LAN router has been established as the adapter automatically sets wireless LAN connection information using the WPS function of the indoor wireless LAN router or the owner of the wireless LAN router manually sets wireless LAN connection information that is only known to this owner, thereby preventing a third party from operating the communication adapter to cause the pairing authentication information to be transmitted from the communication adapter to the administration center.

Further, since the pairing authentication information is provided to the mobile wireless communication terminal from the communication adapter via a direct wireless communication, the user need not perform the operation of entering the pairing authentication information on his/her mobile wireless communication terminal, thereby simplifying user operation on the mobile wireless communication terminal during pairing.

Then, when the administration center has received the same pairing authentication information from both the communication adapter and mobile wireless communication terminal, it associates (i.e. pairs) the user account into which the user has logged through the mobile wireless communication terminal with the identification information of the communication adapter, in order to permit the mobile wireless communication terminal to remotely monitor or remotely operate the hot-water utilization facility connected to the communication adapter paired with the terminal.

Another communication adapter, different from the inventive adapter, is disclosed herein. This other communication adapter is a communication adapter communicably connected to a hot-water utilization facility via a communication line and adapted to establish a wireless link to a wireless LAN router connected to a communication network, so as to be communicably connected to an administration center for remotely monitoring and/or remotely operating the hot-water utilization facility via the wireless LAN router, the communication adapter adapted to function as an access point for providing a direct wireless communication with a mobile wireless communication terminal, wherein the communication adapter is configured, with the mobile wireless communication terminal having established a wireless link in the direct wireless communication, upon receiving information matching wireless LAN connection information for the wireless link to the wireless LAN router from the mobile wireless communication terminal via the direct wireless communication, to transmit predetermined pairing authentication information to the administration center via the wireless LAN router.

The other communication adapter as described above does not transmit pairing authentication information to the administration center unless it has received, from the mobile wireless communication terminal, information matching wireless LAN connection information that can only be known to the owner of the wireless LAN router, thereby preventing illicit pairing operation by a third party.

A pairing system for remotely managing a hot-water utilization facility built using this other communication adapter includes: a communication adapter communicably connected to the hot-water utilization facility via a communication line; a wireless LAN router; an administration center for remotely monitoring and/or remotely operating the hot-water utilization facility; and a mobile wireless communication terminal.

The wireless LAN router and administration center are connected to a communication network.

The administration center is adapted to manage a plurality of user accounts that allow login from the mobile wireless communication terminal.

The communication adapter is adapted to establish a wireless link to the wireless LAN router to be communicably connected to the administration center via the wireless LAN router, the communication adapter adapted to function as an access point for providing a direct wireless communication with the mobile wireless communication terminal; and, with the mobile wireless communication terminal having established a wireless link in the direct wireless communication, upon receiving information matching wireless LAN connection information for the wireless link to the wireless LAN router from the mobile wireless communication terminal via the direct wireless communication, to transmit predetermined pairing authentication information to the administration center via the wireless LAN router and to transmit an authorization command to the mobile wireless communication terminal via the direct wireless communication.

The mobile wireless communication terminal includes an input unit through which the pairing authentication information is entered, and is configured, upon receiving the authorization command from the communication adapter, to log into the administration center and transmit the pairing authentication information entered through the input unit.

When the administration center has verified that the pairing authentication information received from the communication adapter matches that received from the mobile wireless communication terminal, it associates identification information of the communication adapter that has transmitted the pairing authentication information with the user account into which the user has logged through the mobile wireless communication terminal to manage the identification information.

In the above-described pairing system for remotely managing a hot-water utilization facility using the other communication adapter, the communication adapter does not transmit pairing authentication information to the administration center unless it has received, from the mobile wireless communication terminal, information matching wireless LAN connection information that can only be known to the owner of the wireless LAN router, thereby preventing illicit pairing operation by a third party.

Further, when the administration center has received the same pairing authentication information from both the communication adapter and mobile wireless communication terminal, it associates (i.e. pairs) the user account into which the user has logged through the mobile wireless communication terminal with the identification information of the communication adapter, in order to permit the mobile wireless communication terminal to remotely monitor or remotely operate the hot-water utilization facility connected to the communication adapter paired with the terminal.

In the present invention described above, the hot-water utilization facility may be one of various devices and systems using hot-water, e.g., a water heater, a bath system including a water heater, a device for reheating water in a bathtub, a device for filtering water in a bathtub, or a hot-water heating device.

The administration center may be constituted by one server or a plurality of servers; in implementations with a plurality of servers, each server may be built on a machine installed remotely from each other, or the servers may be built on a single machine. It is preferable to provide an application server adapted to manage a plurality of user accounts and to provide various services to a mobile wireless communication terminal owned by a user upon receiving a login from the mobile wireless communication terminal, and a cloud server to which a large number of communication adapters installed in individual homes are permanently connected to allow communication between the communication adapters and cloud server, where the application server and cloud server work together to provide various services.

The administration center (preferably the above-discussed cloud server) may be configured to give unique identification information to each of the communication adapters connected to the center to manage various information for each hot-water utilization facility provided by the communication adapters.

The mobile wireless communication terminal is typically a smartphone, on which dedicated application software may be installed to allow it to function as the mobile wireless communication terminal of the present invention.

The communication adapter may be configured to establish a wireless link to the wireless LAN router and, at the same time, to function as an access point. The wireless LAN connection information for a wireless link to the wireless LAN router is typically composed of an SSID and an encryption key, where the SSID and encryption key of a wireless LAN router are stored and kept in the wireless LAN router. Setting of the wireless LAN connection information for allowing the communication adapter to connect to the wireless LAN router may be performed by an automatic setting function (for example, WPS function) of the wireless LAN router, or the SSID and encryption key of the wireless LAN router may be entered through the mobile wireless communication terminal and these SSID and encryption key may be provided to the communication adapter via the direct wireless communication to set the wireless LAN connection information.

Further, the connection information for a wireless link to allow the mobile wireless communication terminal to directly wirelessly communicate with the communication adapter that functions as an access point is also typically composed of an SSID and an encryption key, where the SSID and encryption key of the communication adapter serving as an access point are stored and kept in the communication adapter.

The mobile wireless communication terminal may connect to the administration center via a mobile communication network such as an LTE line, 4G line or 3G line, or connect from the mobile communication network to the administration center via the internet communication network, or establish a wireless link to the wireless LAN router and connect to the administration center via the wireless LAN router. A typical smartphone connects to one destination; thus, while a wireless link for a direct wireless communication with a communication adapter functioning as an access point is established, the smartphone is disconnected from the administration center and cannot communicate with the administration center. Thus, if the mobile wireless communication terminal is to perform login to the administration center while being connected to the communication adapter, it is preferable that the terminal transmit to the communication adapter a command for terminating its operation as an access point to invalidate the access point function of the communication adapter such that the mobile wireless communication terminal automatically searches for a connection destination to be able to connect to the administration center. Alternatively, a message may be displayed that prompts the user to change the connection destination, where the user manually changes the connection destination to connect the terminal to the administration center.

The pairing authentication information may be a unique serial number given to each communication adapter, and the serial number is preferably stored and kept in the communication adapter. Further, the pairing authentication information may be a combination of such a serial number and a MAC address given to each communication adapter, which prevents easy estimation of the pairing authentication information, further improving security.

Effects of the Invention

The present invention allows only the owner of a wireless LAN router to transmit pairing authentication information from the communication adapter to the administration center, thus preventing a third party from illicitly performing pairing.

EMBODIMENTS FOR CARRYING OUT THE INVENTION

An embodiment of the present invention will now be described with reference to the drawings.

Figure 1:
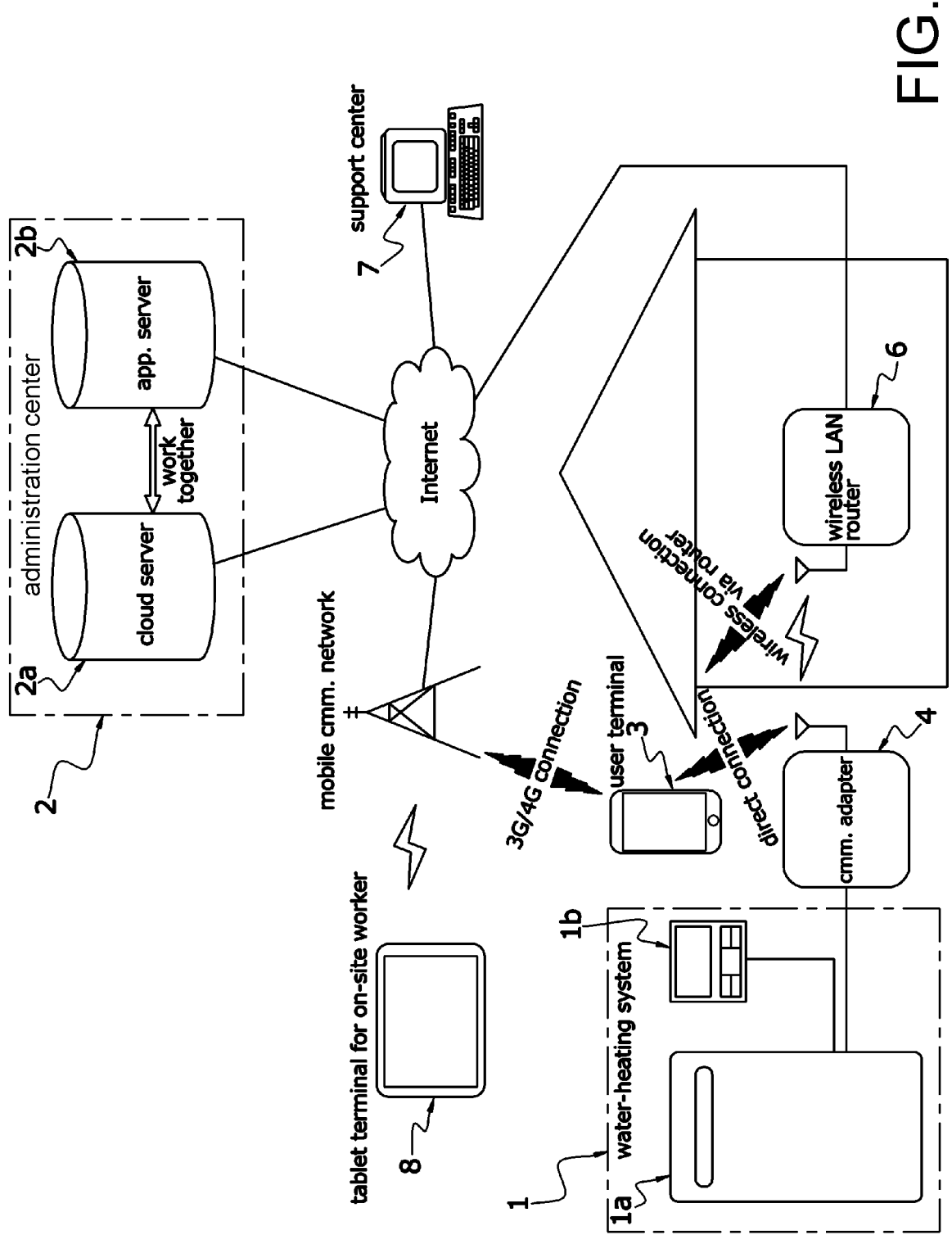
FIG. 1 shows an overall configuration of a remote management system that functions as a pairing system for remotely managing a water heater (an example of the hot-water utilization facility) according to an embodiment of the present invention.

FIG. 1 shows an example of a system configuration of a remote management system including an administration center 2 for remotely monitoring and/or remotely operating a water-heating system 1 (an example of the hot-water utilization facility).

According to the present embodiment, the administration center 2 is composed of a cloud server 2a and an application server 2b connected to the internet (communication network), where the cloud server 2a and application server 2b are communicably connected to each other via the internet or via a dedicated line and work together to provide various services.

The cloud server 2a, to which a large number of communication adapters 4 installed in individual homes are permanently connected, communicates with these communication adapters 4 mainly to collect and manage various kinds of information on the associated water-heating systems 1. The information collected can be designed depending on necessity and may include, for example, the amount of hot-water supplied per unit time, the amount of fuel consumption, the temperature of water being supplied, and information on an error that has occurred in the hot-water system 1.

The application server 2b manages a large number of user accounts for a large number of users in individual homes, and receives a login from a mobile wireless communication terminal such as a smartphone 3 owned by a user and provides various services to the mobile wireless communication terminal owned by the user. Preferably, a dedicated application that allows the use of services provided by the application server 2b is installed on the smartphone 3 to allow the user to perform login and various post-login operations through the dedicated application; alternatively, Web-based services may be provided to allow the user to use an appropriate Web browser to perform login and other operations. Various kinds of information about each user may be associated with a user account for management purposes. For example, a login account name and password necessary to log in, the name and address of the user, the identification information on the communication adapter 4 owned by the user, the system configuration of the water-heating system 1 connected to the communication adapter 4 owned by the user and other information may be associated with the user account for management purposes.

Alternatively, the application server 2b may only provide application services for user terminals such as smartphones 3, and customer information including the user account may be managed by a separate customer information management server.

The services provided by the servers 2a and 2b depend on necessity; for example, the servers may provide connected-device checking, connected-device operation information collection/management, error monitoring, maintenance monitoring, remote operation, and other services.

Connected-device checking is a service that allows the user to check the device type and/or system configuration of the water-heating system 1 connected to the communication adapter 4, discussed below, and determines the device type and/or system configuration based on information collected by the communication adapter 4 from the water-heating system 1.

Connected-device operation information collection/management is a service that collects operation information on the water-heating system 1 from the communication adapter 4 on a regular basis for every unit time (for example, every one hour) and manages this information. Any operation information may be collected; for example, the accumulated amount of water supplied per unit time or the accumulated amount of fuel consumption may be collected. The operation information collected may be suitably used as big data, which is then analyzed to create research materials, for example.

Error monitoring is a service that, when an error occurs in the water-heating system 1, obtains information on the error from the communication adapter 4 and informs a terminal 7 at a support center or sends an error notification to an e-mail address of the user.

Maintenance monitoring is a service that provides real-time monitoring of the operation of the water-heating system 1 when the water-heating system 1 is being repaired, for example, and allows the on-site worker to monitor, in real time, the operation of the water-heating system 1 connected to the designated communication adapter 4 on an appropriate terminal, such as the worker's tablet terminal 8, communicably connected to the cloud server 2a.

Remote operation is a service for remotely operating the water-heating system 1, making it possible to remotely perform, on the terminal 7 at the support center, the smartphone 3 owned by the user or other devices, predetermined operations on the water-heating system 1, such as switching the water supply operation between on and off or changing the set temperature of water being supplied. The user can perform remote operations by logging into the application server 2b through his/her smartphone 3. That is, when the user logs into the application server 2b, the user can perform predetermined operations on the communication adapter 4 associated (i.e. paired) with his/her user account. Additionally, while logged in, the user may view, on his/her smartphone 3, operation information collected from the associated communication adapter 4.

The water-heating system 1 that is remotely monitored and/or remotely operated by this remote management system is connected to the communication adapter 4 via two-core communication lines 5 to enable two-way communication. The communication adapter 4 collects various kinds of information from the water-heating system 1 and provides it to the administration center 2, and also provides operation commands to the water-heating system 1 based on commands from the administration center 2 or the smartphone 3 owned by the user.

The water-heating system 1 includes a water heater 1a and a remote control 1b for providing operation commands to the water heater 1a. The water heater 1a and remote control 1b are communicably connected via the two-core communication lines 5. More particularly, each of the water heater 1a and remote control 1b incorporates a control unit (not shown) constituted by a control microcomputer, where these control units are configured to enable serial communication via the two-core communication lines 5 using a predetermined communication protocol. Further, the water heater 1a may be configured to output power-supply voltages for external devices on the two-core communication lines 5, in which case communication data may be superimposed on supply voltages. The remote control 1b and communication adapter 4 may be operated using supply voltages supplied by the water heater 1b via the two-core communication lines 5, or may incorporate their own power supply circuits. In the implementation shown, the water-heating system 1 and communication adapter 4 are installed outdoors, for example, near the outer wall of a home or in a garage.

A wireless LAN router 6 is installed indoors and is connected to the internet (communication network). The wireless LAN router 6 functions as a parent device for a wireless LAN, and a plurality of wireless LAN child devices can be wirelessly connected to the router. To establish a wireless link between the wireless LAN child devices and wireless LAN router 6, wireless LAN connection information composed of an SSID and an encryption key for the wireless LAN router 6 needs to be set for each child device. To facilitate the setting operation, the wireless LAN router 6 provides a Wi-Fi Protected Setup (WPS) function, where the user may push a WPS button on a child device and push a WPS button on the wireless LAN router 6 to establish a wireless link between the child device and wireless LAN router 6. Each child device may also be configured to allow the user to manually set wireless LAN connection information, and may be configured to allow the user to perform the manual setting operation using a smartphone, personal computer or the like connected communicably to the child device.

The smartphone 3 and communication adapter 4 are capable of functioning as wireless LAN child devices, where wireless LAN connection information composed of an SSID and an encryption key for the wireless LAN router 6 is set to establish a wireless link to the wireless LAN router 6 to allow the smartphone and adapter to connect to the internet via the wireless LAN router 6. The smartphone 3 may store and keep wireless LAN connection information for a plurality of wireless LAN parent devices, where the smartphone is configured to establish a wireless link to a wireless LAN parent device using wireless LAN connection information containing a user designation or, if the wireless link to the currently connected wireless LAN parent device is disconnected, to search for a wireless LAN parent device based on the wireless LAN connection information for the plurality of devices to automatically establish a wireless link. If the smartphone 3 is not able to connect to any of the devices associated with the wireless LAN connection information stored and kept by the smartphone, the smartphone is configured to connect to the internet via a mobile communication network such as a 4G or 3G line.

The communication adapter 4 incorporates a wireless communication controller (not shown) for wirelessly communicating with the wireless LAN router 6 using a predetermined communication protocol (for example, IEEE 802.11n, IEEE 802.11g, or IEEE 802.11b). For example, the wireless communication controller may be a commercial, custom programmable wireless LAN module, where the wireless communication controller can function as a main control unit for the communication adapter 4. Alternatively, a microprocessor separate from the wireless communication controller may be mounted to serve as the main control unit.

Once the control unit of the communication adapter 4 has established the wireless link to the wireless LAN router 6, it automatically connects to the cloud server 2a and, upon connection, transmits various kinds of system configuration information. The system configuration information includes the serial number (S/N) and MAC address of the communication adapter 4, which are used as pairing authentication information, as discussed below. A serial number is a unique character string given to each communication adapter 4, and is stored and kept on non-volatile memory within the control unit of the communication adapter 4 before shipping and used as identification information for the communication adapter 4.

Further, the control unit of the transmission adapter 4 may provide: an information collection function that collects various kinds of information relating to the water-heating system 1 stored and kept by the control units of the water heater 1a and remote control 1b by communicating with the water-heating system 1; an information transmission function that transmits the collected information to the cloud server 2a; a first communication failure detection function that detects the occurrence of a failure in a communication to the water-heating system 1; a second communication failure detection function that detects the occurrence of a failure in a connection to the wireless LAN router 6; a third communication failure detection function that detects the occurrence of a failure in a communication between the wireless LAN router 6 and cloud server 2a; and a radio field intensity detection function that detects the field intensity of radio waves received from the wireless LAN router 6.

These functions may be implemented by functions mounted on the wireless communication controller in its initial state or by custom programming of the wireless communication controller, and the timing in which the various functions are performed may be designed as appropriate. For example, the information collection function and information transmission function may be performed regularly at predetermined intervals, or may be performed upon reception of a request from the cloud server 2a for information transmission. Further, the first to third communication failure detection functions may detect communication failures based on errors in communications that have occurred while the information collection function and information transmission function are being performed, or may detect communication failures based on results from performing, at predetermined time points, trial transmission/ reception of appropriate dummy data separately from the process of the information collection function and information transmission function, or may detect communication failures by any other appropriate process.

Further, while establishing a wireless link to the wireless LAN router 6, the communication adapter 4 according to the present embodiment is also configured, at the same time, to function as an access point for providing a direct wireless communication (wireless LAN communication) with the smartphone 3, i.e. as a wireless LAN parent device. To provide the function as such an access point, the wireless communication controller of the transmission adapter 4 stores and keeps the SSID and encryption key of the communication adapter 4 to be used as connection information for a direct wireless communication. The user can switch the access point function between valid and invalid by operating a button provided on the communication adapter 4.

Further, the communication adapter 4 is configured to be able to invalidate the access point function and to initialize the SSID and encryption key of the wireless LAN router 6 set in the communication adapter 4 in response to commands from the smartphone 3 connected to the adapter via the direct wireless communication.

Now, the pairing process for associating the user account of each user with the communication adapter 4 owned by the user will be described with reference to FIG. 2.

Figure 2:
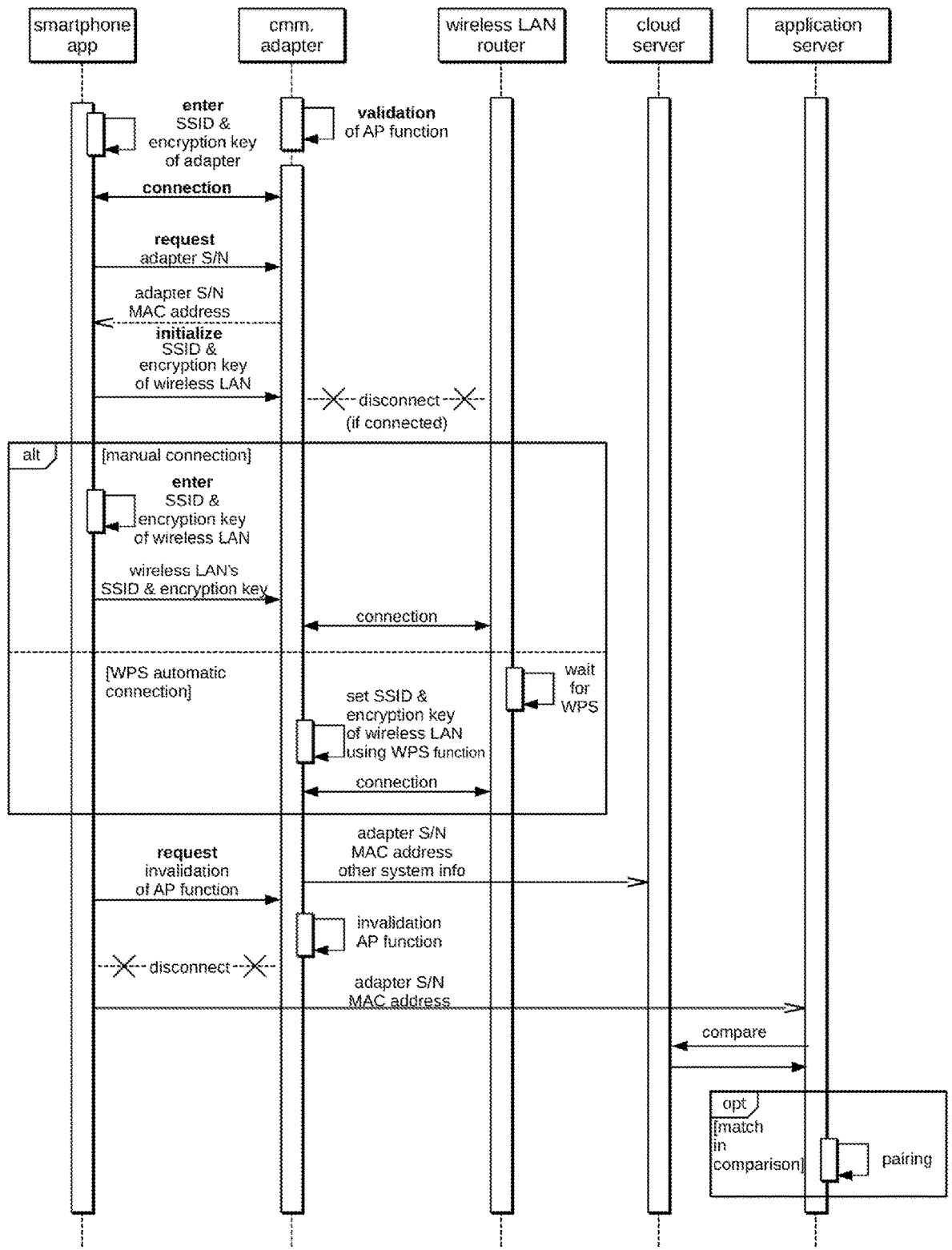
FIG. 2 is a sequence diagram of a pairing process in the pairing system.

In the initial state of the communication adapter 4 upon installation, the user account is not yet associated with the communication adapter 4; the user account is associated with the identification information (for example, serial number) of the communication adapter 4 as the pairing process shown in FIG. 2 is performed.

To perform pairing, the user first validates the access point function (AP function) of the communication adapter 4. At this point, the communication adapter 4 may or may not establish a wireless link to the wireless LAN router 6.

Meanwhile, when the user starts the pairing application on his/her smartphone 3, the application prompts the user to enter connection information for the communication adapter 4 for establishing a wireless link for a direct wireless communication with the communication adapter 4, i.e. the SSID and encryption key of the communication adapter 4. In some configurations, the SSID and encryption key of the communication adapter 4 may be entered through an input method such as a virtual keyboard on the smartphone 3; in other configurations, a two-dimensional code such as QR code (registered trademark) or a one-dimensional code such as barcode containing connection information may be attached to the housing of the communication adapter 4 and the two- or one-dimensional code may be captured using a camera incorporated in the smartphone 3 to input the SSID and encryption key.

Once the connection information for the communication adapter 4 is correctly entered, a wireless link of direct wireless communication is established between the smartphone 3 and communication adapter 4 to connect the smartphone 3 and communication adapter 4 such that they can directly wirelessly communicate with each other.

Next, the pairing application requests the communication adapter 4 to provide the serial number (S/N) of the communication adapter 4 that is to be used as pairing authentication information.

Then, the communication adapter 4 provides, via the direct wireless communication, the serial number (S/N) and MAC address of the communication adapter 4 to be used as pairing authentication information.

Next, the pairing application commands the communication adapter 4 to initialize the SSID and encryption key (wireless LAN connection information) of the wireless LAN router 6 set in the communication adapter 4. Thus, even if a wireless link has been established between the communication adapter 4 and wireless LAN router 6, this wireless link is disconnected and the communication adapter 4 is also disconnected from the cloud server 2a. In the exemplary sequence shown in FIG. 2, the command for initialization is issued after the pairing authentication information is provided; alternatively, this command may be transmitted to the communication adapter 4 at the same time as a request for a serial number is sent to the communication adapter 4. Further, the initialization may not be commanded by the pairing application, and the communication adapter 4 may be configured to autonomously initialize the pairing authentication information when it is to provide it to the smartphone 3. Further, while it is preferable to initialize both the SSID and encryption key, only the encryption key may be initialized. The "initialization" does not necessarily need to fill the information with blanks or zeros, but may set a random letter or numeral string.

Then, after the initialization, a connection operation is performed to establish a wireless link between the communication adapter 4 and wireless LAN router 6. The connection operation may be performed manually or by WPS automatic connection. For manual connection, the SSID and encryption key of the wireless LAN router 6 are entered through the smartphone 3 and the communication adapter 4 is commanded to set the entered SSID and encryption key of the wireless LAN router 6 to be used as wireless LAN connection information. On the other hand, for WPS automatic connection, the SSID and encryption key of the wireless LAN router 6 are set by the WPS automatic connection function. Once the wireless LAN connection information is correctly set, a wireless link is established between the communication adapter 4 and wireless LAN router 6 to provide a communicable connection such that the communication adapter 4 can connect to the cloud server 2a via the internet.

When the wireless link has been established to the wireless LAN router 6, the communication adapter 4 transmits, to the cloud server 2a, system configuration information containing the pairing authentication information composed of the serial number and MAC address of the communication adapter 4, as discussed above. The cloud server 2a stores and keeps the system configuration information together with information on the date and time of receipt.

Meanwhile, after the communication adapter 4 and wireless LAN router 6 are connected, the pairing application on the smartphone 3 sends to the communication adapter 4 a command for invalidating the access point function. In response, the communication adapter 4 invalidates its access point function. Then, the smartphone 3 conducts a renewed search for a connection destination and, if wireless LAN connection information for the wireless LAN router 6 has been set, automatically connects to the wireless LAN router 6 to connect to the internet via the router 6 or, if such connection information has not been set, connects to the internet via a 3G or 4G line. The pairing application is configured, after connecting to the internet in the above-discussed manner, to log into the application server 2b and transmit, to the application server 2b, the pairing authentication information, i.e. the serial number and MAC address of the communication adapter 4 obtained from the communication adapter 4. Prior to login to the application server 2b, it is preferable to prompt the user to enter the account ID and password.

The application server 2b, after receiving the pairing authentication information, works together with the cloud server 2a to compare it with the pairing authentication information provided to the cloud server 2a from the communication adapter 4 and, if it determines that these two pieces of information match, associates the serial number (identification information) of the communication adapter 4 that has transmitted the pairing authentication information to the cloud server 2a, with the user account that has logged into the application server 2b and transmitted the pairing authentication information, and thus manages the identification information. The comparing process may be performed only if the time difference between the date/time at which the cloud server 2a received pairing authentication information from the communication adapter 4 and the date/time at which the application server 2b received pairing authentication information from the smartphone 3 is smaller than a predetermined amount of time (for example, shorter than five minutes).

After the user account and communication adapter 4 have been paired in this manner, the user can remotely monitor and/or remotely operate the water-heating system 1 through his/her smartphone 3 by logging into the application server 2b using this user account. Thus, the remote management system according to the present embodiment also functions as a pairing system for remotely managing the water-heating system 1. Depending on the wish of the user, only remote monitoring or only remote operation may be provided, or both of these services may be provided.

Figure 3:
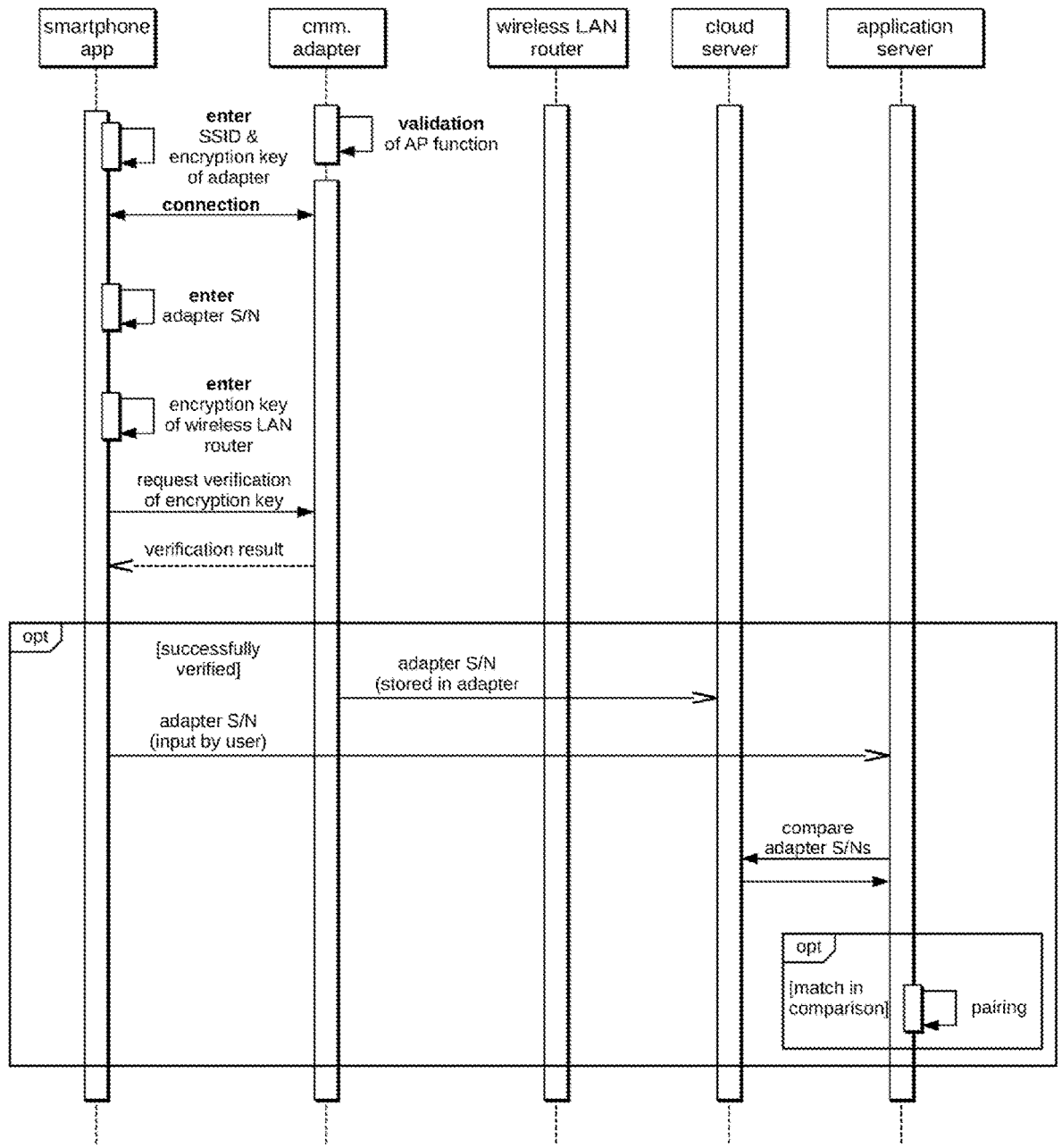
FIG. 3 is a sequence diagram of a pairing process according to a reference example.

FIG. 3 shows a sequence diagram of a pairing system according to a reference example different from the present invention. According to the present reference example, a wireless link is established between the communication adapter 4 and wireless LAN router 6 at the time of initiation of the pairing operation, and the communication adapter 4 stores and keeps the SSID and encryption key of the wireless LAN router 6.

To perform pairing, first, the access point function (AP function) of the communication adapter 4 is validated.

Meanwhile, when the user has started the pairing application on his/her smartphone 3, first, the user is prompted to enter the connection information for the communication adapter 4 for establishing a wireless link for a direct wireless communication with the communication adapter 4, that is, the SSID and encryption key of the communication adapter 4, which is connection information for a direct wireless communication with the communication adapter 4.

When the correct connection information for the communication adapter 4 is entered, a wireless link of direct wireless communication is established between the smartphone 3 and communication adapter 4 to connect the smartphone 3 with the communication adapter 4 such that they can directly wirelessly communicate with each other.

Next, the pairing application prompts the user to enter the serial number (S/N) of the communication adapter 4. The serial number may be indicated on a label attached to the housing of the communication adapter 4.

Next, the pairing application prompts the user to enter the encryption key of the wireless LAN router 6 (i.e. wireless LAN connection information). When the encryption key has been entered, the pairing application transmits, to the communication adapter 4, the entered encryption key and a request for verification via the direct wireless communication.

When the communication adapter 4 has received the request for verification of the encryption key via the direct wireless communication, the adapter determines whether the received encryption key matches the encryption key of the wireless LAN router 6 set in the communication adapter 4 (i.e. wireless LAN connection information), and sends back the result of the verification to the smartphone 3 via the direct wireless communication. More specifically, if these keys match, the adapter sends back an indication of authorization that indicates successful verification, or, if they do not match, sends back an indication of rejection that indicates unsuccessful verification. The adapter may be configured to prompt the user to re-enter the encryption key in the case of unsuccessful verification.

In the case of successful verification, the communication adapter 4 transmits, to the cloud server 2a, the serial number (S/N) of the communication adapter 4 stored and kept by itself to be used as pairing authentication information, and the pairing application of the smartphone 3 logs into the application server 2b and transmits, to the application server 2b, the serial number (S/N) of the communication adapter 4 entered by the user to be used as pairing authentication information. As is the case with the embodiment shown in FIG. 2, the smartphone 3 may transmit, to the communication adapter 4, a request for invalidating the access point function so as to be able to connect to the internet; alternatively, the user may manually switch the connection destination to the wireless LAN router 6.

The cloud server 2a and application server 2b are configured to compare the pairing authentication information (i.e. adapter's serial number) received from the communication adapter 4 with the pairing authentication information received from the smartphone 3 and, if they determine the existence of a match, associate the identification information i.e. serial number of the communication adapter 4 that has transmitted pairing authentication information to the cloud server 2a, with the user account being in login through the smartphone 3 that has transmitted pairing authentication information to the application server 2b, and thus manages the identification information.

The present invention is not limited to the above-illustrated embodiment and its design can be modified as appropriate. For example, the communication adapter may be incorporated in the housing of the water heater, in which case the connection lines connecting the communication adapter with the control unit of the water heater may be internal lines in the housing. Further, the control unit of the water heater and the communication adapter may be mounted on the same circuit board, in which case the connection lines may be a wiring pattern on the board.

EXPLANATION OF CHARACTERS

1: hot-water utilization facility (water-heating system)
2: administration center
3: mobile wireless communication terminal (smartphone)
4: communication adapter
5: communication lines
6: wireless LAN router

The invention claimed is:

1. A communication adapter communicably connected to a hot-water utilization facility via a communication line and adapted to establish a wireless link to a wireless LAN router connected to a communication network, so as to be communicably connected to an administration center for remotely monitoring and/or remotely operating the hot-water utilization facility via the wireless LAN router, the communication adapter adapted to function as an access point for providing a direct wireless communication with a mobile wireless communication terminal, wherein the communication adapter is configured, with the mobile wireless communication terminal having established a wireless link in the direct wireless communication, in response to a request from the mobile wireless communication terminal via the direct wireless communication, to provide a predetermined pairing authentication information to the mobile wireless communication terminal via the direct wireless communication;

in response to a request from the mobile wireless communication terminal or autonomously when providing the pairing authentication information, to initialize wireless LAN connection for a wireless link to the wireless LAN router in order to disconnect the wireless link to the wireless LAN router; and, when the wireless LAN connection is set after the initialization, to establish a wireless link to the wireless LAN router and transmit the pairing authentication information to the administration center via the wireless LAN router.

2. A pairing system for remotely managing a hot-water utilization facility, comprising: the communication adapter according to claim 1, the communication adapter being communicably connected to the hot-water utilization facility via a communication line; a wireless LAN router; an administration center for remotely monitoring and/or remotely operating the hot-water utilization facility; and a mobile wireless communication terminal, the wireless LAN router and administration center being connected to a communication network, the administration center being adapted to manage a plurality of user accounts that allow login from the mobile wireless communication terminal, the mobile wireless communication terminal being configured, after obtaining the pairing authentication information from the communication adapter, to log into the administration center and transmit the pairing authentication information to the center, the communication adapter being adapted to establish a wireless link to the wireless LAN router to be communicably connected to the administration center via the wireless LAN router, the communication adapter adapted to function as an access point for providing a direct wireless communication with the mobile wireless communication terminal, wherein, when the administration center has verified that the pairing authentication information received from the communication adapter matches that received from the mobile wireless communication terminal, the center associates identification information of the communication adapter that has transmitted the pairing authentication information with a user account to which login has occurred through the mobile wireless communication terminal to manage the identification information.

\* \* \* \* \*